United States Patent [19]

Pack

[11] 4,089,271
[45] May 16, 1978

[54] LOAD SUPPORTING AND MOVING PORTABLE ROLLER SKID

[76] Inventor: Charles L. Pack, 641 Glenco, St. Charles, Mo. 63301

[21] Appl. No.: 751,019

[22] Filed: Dec. 16, 1976

[51] Int. Cl.² ............................................. B65G 7/04
[52] U.S. Cl. ..................................... 104/134; 193/41; 214/1 H; 238/13
[58] Field of Search ..................... 193/35 R, 35 C, 38, 193/41; 238/13; 214/1 H; 280/32; 104/134, 135

[56] References Cited

U.S. PATENT DOCUMENTS

| 1,742,475 | 1/1930 | Kress | 238/13 |
| 3,789,558 | 2/1974 | Spencer et al. | 214/1 H |
| 3,794,186 | 2/1974 | Baxter | 238/13 |
| 3,998,340 | 12/1976 | Westwood | 193/35 R |

Primary Examiner—John J. Love
Assistant Examiner—Jeffrey V. Nase
Attorney, Agent, or Firm—Gravely, Lieder & Woodruff

[57] ABSTRACT

A portable roller skid for moving bulky or heavy loads in which the skid has a body with a set of load supporting rollers, and means to fix the skid under a load. The skid is constructed to provide one direction of load movement and when coupled in pairs the skids provide two directions of movement for a load.

1 Claim, 6 Drawing Figures

LOAD SUPPORTING AND MOVING PORTABLE ROLLER SKID

BACKGROUND OF THE INVENTION

The problem with moving and setting loads into position aligned with a receiving base is difficult when the load is a mobile home and the base is an excavation, pier, or slab. Methods prevailing in the mobile home business of delivering a home to the site selected require expensive lifting equipment and involve many hours of manual labor. The size of mobile homes is increasing and the weight is getting beyond the capability of currently available equipment. Furthermore, mobile homes are substantially completely fabricated and assembled at the factory before being hauled to the final site, thereby making it highly important to avoid damaging the structure during the placement on the foundation.

In the last few years double wide homes have become more desirable. Many of these double wide homes are delivered to private property sites where the owner has prepared a basement excavation, or the home must be set down on piers over a crawl space. The delivery and set up costs for homes of these sizes have increased to the point where conventional methods are too expensive and time consuming. In many instances the home must be moved into position between other homes or objects which restrict the maneuvering space and add to the cost of installation.

BRIEF DESCRIPTION OF THE INVENTION

This invention relates to improvements in load supporting and moving portable roller skids which can be used singly to move a load in one direction or in stacked pairs to move a load in two directions.

While the load may be any one of a number of objects, the present skids have special utility in connection with the locating of mobile homes. The characteristic structure and features of the load supporting and moving portable roller skids will be set forth in the following description.

The present invention is exemplified in a load supporting and moving portable roller skid comprising a body having side members retained in spaced relation and projecting to the same side so as to form a channel space to receive a plurality of load carrying rollers having supporting bearings in the side members, and means on the body in position to retain the roller skid in load supporting and moving position.

The invention is further exemplified by load supporting and moving portable roller skids which may be utilized in pairs for the purpose of allowing the load to be moved in directions substantially at right angles.

BRIEF DESCRIPTION OF THE DRAWINGS

The present invention has been illustrated in the accompanying drawings, wherein.

DETAILED DESCRIPTION OF THE INVENTION

Figure 1:
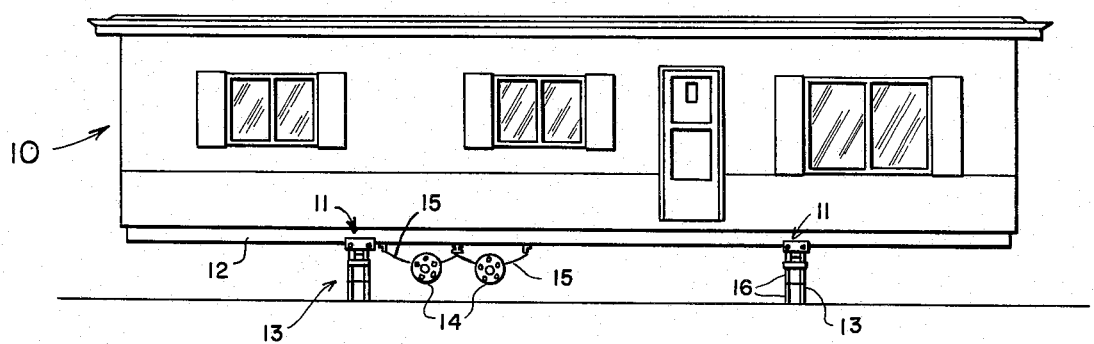
FIG. 1 is a side elevational view of a mobile home shown in position supported on the portable roller skids.

There is shown in FIG. 1 a mobile home representative of the character of load which the portable roller skids are designed to support and move. The mobile home 10 is shown in elevated position ready to be moved over the basement or foundation where it will be permanently located. A pair of portable roller skids 11 are shown engaged with one of the main longitudinal beams 12 of the mobile home 10, and each of the roller skids is supported on suitable blocks which form a longitudinal run-way 13 lined up in the direction in which the mobile home 10 is to be moved. In normal operation there would be at least a pair of roller skids 11 on each of the run-ways 13 to support the longitudinal beams for the mobile home and to provide lateral stability by furnishing at least four points of support. The mobile home 10 is adapted to be lower onto the roller skids 11 and for this purpose the tires have been removed from the wheels 14, but the wheels and suspension springs 15 have not been removed as that is unnecessary in order to obtain ground clearance. When the mobile home 10 is brought to the building site it is supported by the tires on the wheels 14 and by the towing tractor. The home is maneuvered into position where the run-ways 13 are to be installed and is then detached from the towing tractor and elevated by suitable stationary jacks. The run-ways 13 are then erected and the roller skids 11 are placed on the run-ways 13 and attached to the longitudinal beams 12 (only one of which is shown in FIG. 1).

Figure 5:
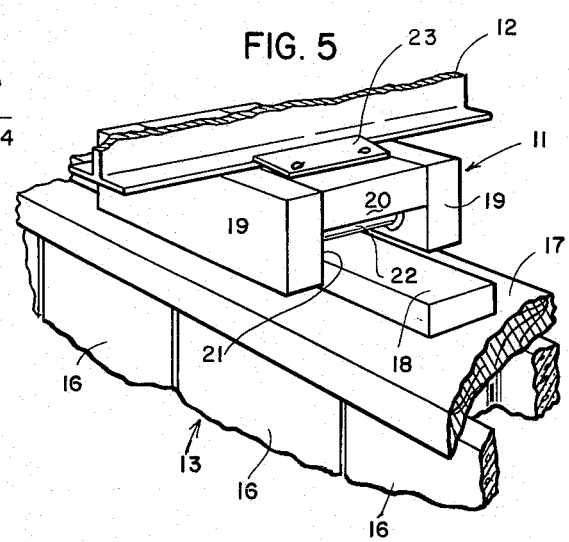
FIG. 5 is a fragmentary perspective view of the portable roller skid shown in operable load supporting and moving position.

Turning now to FIG. 5 a typical installation of a roller skid 11 under the beam 12 is shown to advantage. The run-way 13 is made up of typical concrete blocks 16 in whatever stacked relation is required to build up a support for a timber plate 17 which is rested on the top of blocks 16. The plate 17 and the supporting blocks are of course properly aligned to form a run-way for moving the mobile home in the desired direction. The plate 17 carries a guide 18 of a sufficient width to maintain the side members 19 of the roller skid 11 moving in the desired direction. The side members 19 are attached to and held in spaced relation by a spanner member 20 which has a thickness less than the width of said members 19 so as to form a channel 21 to receive load supporting rollers 22, one of which is seen in FIG. 5. The rollers engage the guide 18 and the side members 19 straddle the guide 18 so as to allow complete mobility of the roller skid 11 in either direction along the guide 18. It can be seen that the support member 12 for the mobile home is engaged on the upper surface of the roller skid and is held in operative position by a fixed plate 23 which engages the lower flange of the member 12.

Figure 2:
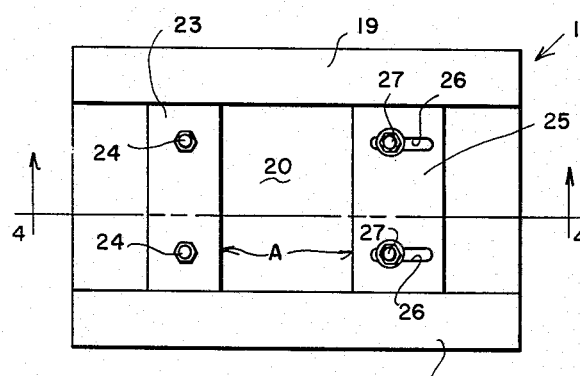
FIG. 2 is a top plan view of a portable roller skid.
Figure 3:
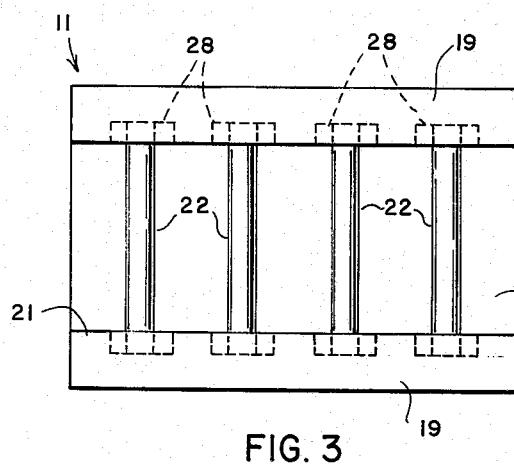
FIG. 3 is a view of the portable roller skid as seen from the under side of the view shown in FIG. 2.
Figure 4:
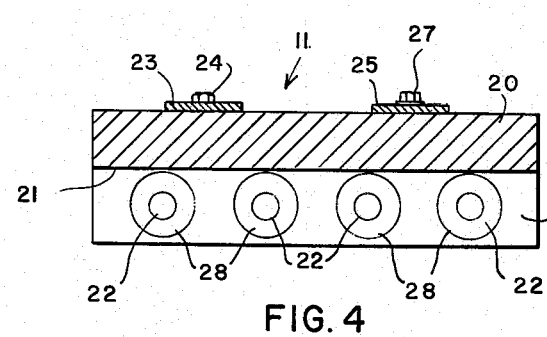
FIG. 4 is a sectional elevational view taken at line 4—4 of FIG. 2.

The structural characteristics of a typical roller skid 11 has been illustrated in FIGS. 2, 3 and 4. It can be seen that the side members 19 are attached to opposite sides of the spanner member 20, thereby providing an upper load supporting surface which carries the fixed plate 23 secured by suitable fasteners 24 and an adjustable plate 25 formed with slots 26 for receiving the securing elements 27. The adjustable plate 25 permits variations in the spacing A with the fixed plate 23 to accommodate different flange dimensions of the support members 12.

As seen in FIGS. 3 and 4, there are a plurality of load carrying rollers 22 arranged in parallel relationship and extending across the width of the channel 21 between the side members 19. The opposite ends of the respective rollers are operatively carried in suitable anti-friction bearings 28, and the bearings may be press fitted into recesses in the side members 19 as is well understood.

Figure 6:
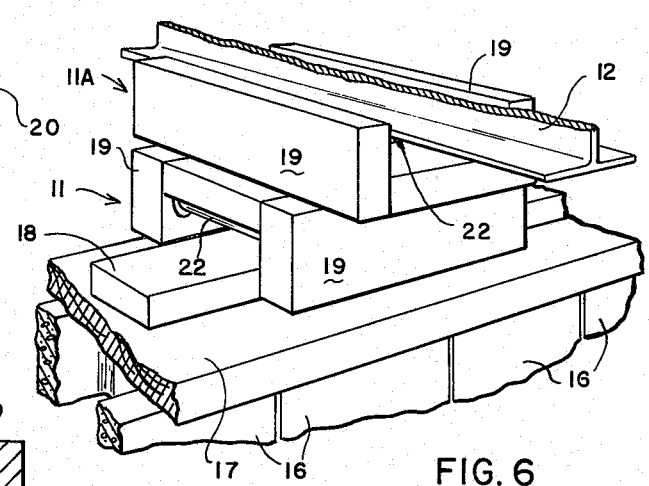
FIG. 6 is a further fragmentary perspective view of a pair of portable roller skids shown in cooperative positions for supporting and moving a load in right angular directions.

It can be appreciated in the view of FIG. 5 that the member 12 which represents the load to be supported and moved is rendered movable along the length of the guide 18 supported by the plate 17. If it is desirable to move the load in two right angular directions, a pair of roller skids 11 and 11A are required. FIG. 6 illustrates the manner of combining the roller skids 11 and 11A. As shown, the lower skid 11 with its plates 23 and 25 removed is mounted over the guide 18 on the plate 17 so that its rollers 22 are engaged on the guide 18. The cooperating roller skid 11A without plates 23 and 25 is turned with the rollers 22 uppermost and with the side members 19 directed across the side members 19 of the lower roller skid 11, thereby presenting the rollers 22 of roller skid 11A in an upwardly facing position to be engaged by the member 12 which is captured between the side members 19.

When combined in the manner illustrated in FIG. 6 it is readily apparent that the roller skid 11 is movable along the guide 18 while the member 12 is movable relative to the roller skid 11A in a direction substantially perpendicular to the direction of movement of the roller skid 11. It may or may not be necessary to employ the fixed and adjustable plates 23 and 25 respectively in the assembly of FIG. 6 as the normal friction between the roller skids 11 and 11A will prevent misalignment. When used in pairs, the upper skid 11A becomes the means (replacing plates 23 and 25) carried by the lower skid 11 to retain the lower skid 11 in load supporting and moving position.

The method of use of the portable roller skids is to set up the blocks 16 forming the run-ways 13 in a direction that will direct the movement of the mobile home 10 toward and over the basement, or slab, or other location where it will be set down. The roller skids are installed similarly as shown in FIG. 5, or in cooperating pairs, as shown in FIG. 6, depending on the movement necessary to place the home 10 as desired. Since the weight of a mobile home is considerable it is generally found necessary to use power operated "come alongs" which will draw the home in the direction desired on the roller skids. When the home is properly set over the basement or slab it is then temporarily jacked up in order to remove the roller skids and run-ways before being lowered into final position. The skids are then available for further use with another mobile home or load to be maneuvered by such devices.

The foregoing described method of use of the portable roller skids should now be well understood, and it should be appreciated that the portable roller skid will permit a load of considerable weight and size, such as a mobile home 10, to be moved into position between fixed objects, such as other mobile homes, for the reason that the skids are located entirely within the lengthwise dimension of the mobile home, or the load to be moved. Skids of the present invention permit the power operated come alongs or other equivalent means to be located at one side and do not require any maneuvering room outside of the longitudinal dimension.

What is claimed is:

1. Load supporting and moving means comprising: fixed means forming load directing run-ways; load supporting and guiding means carried by said run-ways, said last means having a longitudinal rollway surface presented to the load to be moved and opposed side margins; roller skid means mounted on said rollway surface in position to present a load engaging surface to the load to be moved, each roller skid means including a pair of side members spaced apart and disposed at the opposite side margins of said load supporting and guiding means, bearings mounted in each of said side members in opposed facing alignment, rollers engaged in said bearings and extending in parallel relation between said side members, said side members presenting load bearing surfaces to the load to be moved, and separately formed means spaced from said rollers and engaged with and between said side members adjacent said load bearing surfaces of said side members to retain them in spaced apart relation; and clamping means carried by the skid means in position to secure the load on said load bearing surfaces opposite said rollers so as to locate said roller skid means in position to support and move the load, said clamping means including a fixed member and a cooperating adjustable member for clamping the load against said fixed member.

* * * * *